(No Model.)

C. F. SCOTT.
ELECTRIC CONVERTER.

No. 546,476. Patented Sept. 17, 1895.

WITNESSES:
Ethan I. Dodds
Hubert C. Tener

INVENTOR
Charles F. Scott
BY
Terry, MacKaye & Carr
ATTORNEYS.

UNITED STATES PATENT OFFICE.

CHARLES F. SCOTT, OF PITTSBURG, PENNSYLVANIA, ASSIGNOR TO THE WESTINGHOUSE ELECTRIC AND MANUFACTURING COMPANY, OF SAME PLACE.

ELECTRIC CONVERTER.

SPECIFICATION forming part of Letters Patent No. 546,476, dated September 17, 1895.

Application filed January 12, 1895. Serial No. 534,639. (No model.)

*To all whom it may concern:*

Be it known that I, CHARLES F. SCOTT, a citizen of the United States, residing in Pittsburg, in the county of Allegheny, State of Pennsylvania, have invented a new and useful Improvement in Electric Converters, (Case No. 606,) of which the following is a specification.

My invention relates to windings for electric converters, and particularly to those in which the quantity of current is such as to require a conductor of large cross-sectional area.

The object of my invention is the provision of a coil of the kind named wherein Foucault currents shall, as far as possible, be avoided, wherein an approximately uniform distribution of current shall be obtained, and wherein certain advantages of shape and proportion shall be secured at a minimum cost of money and labor.

Figure 1:
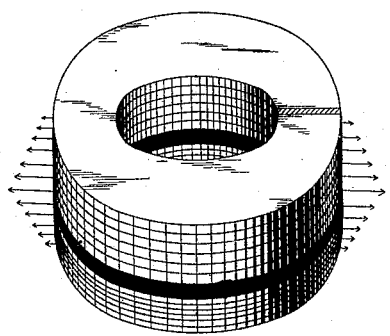
Figure 2:
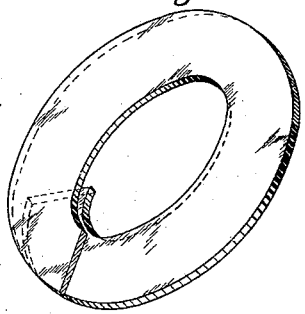
Figure 3:
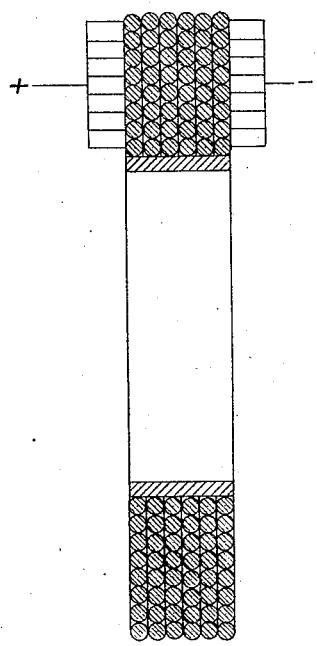
Figure 4:
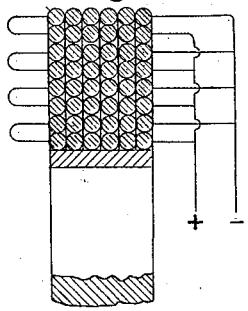
Figure 5:
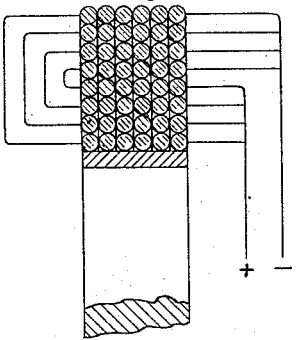
Figure 6:
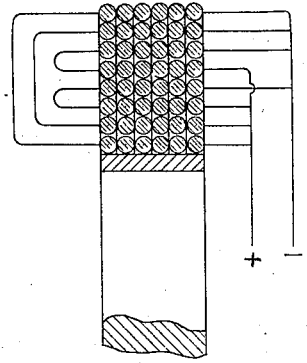

Figure 1 is a perspective view of the primary and secondary coils of a converter of the step-down type, showing what is known as the "parallel arrangement," or that wherein the primary and secondary are placed side by side upon the same axis. This figure also shows the leakage lines of force which tend to produce Foucault currents. Fig. 2 is a perspective view of one form of flat conductor, illustrative of the principle which it is desirable to carry out in converters of the type shown in Fig. 1. Fig. 3 is a diagrammatic illustration of the simplest method whereby the effects of the use of the form of conductor shown in Fig. 2 may be obtained without the disadvantages arising from the special manufacture of flat conductors. Fig. 4 shows the top part of the secondary of a converter in a diagrammatic form similar to that found in Fig. 3, but showing a modified arrangement of wires. Figs. 5 and 6 are further modifications for the purpose of obtaining improved distribution of current.

For many reasons it is desirable to wind the secondaries of step-down converters in such a form as to obtain a greater depth than breadth, the breadth of the converter-coil being measured along its axis. With a given proportion or given outside measurement of a secondary coil, it is often very inconvenient with the sizes of wire at hand to produce a coil having the number of turns requisite in any given case. It therefore becomes desirable to employ fine wire, which, by superposition and use in multiple arc, can be made to build up, so to speak, the desired form of total wire for the filling up of the available space and at the same time the attainment of the desired number of ampère-turns. In the next place it is found that currents in the primary and secondary coils of a converter tend not only to send lines of force through their common axis, but also to send lines between the coils in the plane separating them and also through the coils themselves in a direction parallel to that plane. These lines of force may be called "leakage-lines." The result of such an alternating field is the setting up of Foucault currents in any conductor which has a considerable width in the direction at right angles to the direction of the leakage-lines.

Supposing the primary and secondary to lie side by side, as shown in Fig. 1, in this case the leakage-lines will take the path indicated approximately by the small arrows, and it is therefore desirable that the windings on the secondary, where large wire or its equivalent must be used, which is the case in step-down converters, should lie so that the width of conductor shall be in a direction at right angles to the axis of the two coils, or, in other words, shall coincide as far as possible with the direction of the lines of force. This arrangement is attained very perfectly by the use of single broad hoops, such as shown in Fig. 2, employed side by side, as indicated in Fig. 1; but in some cases it is desirable for certain reasons to employ wires instead of flat hoops, and it is the object of my invention to so employ small wires in the scondary of a step-down converter of this kind and to so arrange them that they shall have all the advantages of the flat hoop-conductor shown in Fig. 2, without the disadvantage incident to the manufacture of the latter.

In accomplishing the above-named object I wind the fine wire one or two layers at a time, cutting off the end of each layer or pair of layers and leaving the ends loose until the whole secondary has been built up. The opposite ends of each annular single or double coil are then respectively connected together and the arrangement shown in Fig. 3 or Fig. 4 is thus attained.

In the arrangement shown in Fig. 3 the wire is wound in single annular layers, and the first ends of all the layers are connected in multiple arc, as are also the other ends, the current being then taken off at the two ends in multiple arc. It will thus be seen that the equivalent of the hoop-shaped conductor is attained, inasmuch as the current flows around the coil in a series of broad annuli placed side by side. Of course the arrangement where the primary and secondary are superposed, as above mentioned, would require the connection of the fine wires in the secondary in multiple arc in such a manner that the current would flow in cylindrical paths superposed one upon the other.

In Fig. 4 is shown a modification of this arrangement wherein two layers are completed before the wire is cut. This form is more convenient than the other, inasmuch as all the ends come out at the same side of the coil, as is shown.

A certain disadvantage exists in the forms shown in Figs. 3 and 4, from the fact that the distribution of current throughout all the wires of a given annular section is not uniform. The inmost convolutions of each annulus are much shorter than the outermost, and consequently will offer a less resistance to the current. This being a fact, a greater proportion of the current will be carried on the inner than on the outer coils. This objection may be overcome by the use of the form shown in Fig. 5, wherein the wires are wound in pairs of layers; but the pairs are not successive. The innermost layer, being finished, is carried around to form the beginning of the outermost layer, and thus a constant average length of all the branches in multiple arc is secured. Looking at Fig. 5, we see that there are eight cylindrical layers wound around the core. The inmost layer is carried across six convolutions, and is then brought up to the eighth layer, which is wound back again and the two ends of the double layer connected, respectively, to the plus and minus end of the system of distribution. The second layer from the center, when finished, is continued to begin the seventh also, which is wound back. The third layer is continued in the sixth, and the fourth in the fifth. The ends are connected as shown in the drawings, and a uniform distribution of current is thus secured. In practice, of course, successive layers from the center must be successively wound, and therefore the ends of all the inner layers, except the fourth, are cut off and left loose until the layer with which they are to be connected is begun.

In Fig. 6 is shown a modification wherein the uniformity of distribution attained in Fig. 5 is not so strictly carried out, but wherein a certain amount of labor is saved, inasmuch as only the inmost and outmost layers are connected together while the layers between these are carried on in successive order, as shown in Fig. 4. This obviates the necessity of cutting off so many ends and makes a better looking coil and one which is more quickly made.

It is thus seen that by the employment of my invention all the advantages of the use of small wire are obtained, in connection with the advantages of the broad hoop-shaped conductors for low-tension secondaries. These advantages are obtained without the difficulty of winding a number of wires at once in a single plane.

The principle of my invention is of course applicable to any form of converter, and I do not wish to be understood as limiting myself to the form shown in the drawings.

What I claim is—

1. In a converter, a secondary coil presenting a plurality of conducting paths leading to a single work circuit and having considerable breadth in a single plane, as nearly as possible parallel to the leakage lines of the converter, substantially as described.

2. In a converter, a secondary coil comprising a series of successive cylindrical layers of wire, the opposite ends of which are connected in multiple arc to opposite ends of the secondary distributing system, thus constituting a plurality of conducting paths of considerable breadth and substantially parallel to the leakage lines of the converter.

3. In a converter, a secondary composed of successive double layers the opposite ends of which are connected in multiple arc to the terminals of the secondary distributing system, substantially as described.

4. In a converter, a secondary composed of a number of layers of wire, said layers being connected in pairs, the end of the inmost layer being connected to the beginning of the outermost and so on, in such a manner as to provide a number of substantially equal branches in multiple arc, substantially as described.

In testimony whereof I have hereunto subscribed my name this 7th day of January, A. D. 1895.

CHAS. F. SCOTT.

Witnesses:
 ALFRED DICKSON,
 JAMES WM. SMITH.